United States Patent Office 3,478,058
Patented Nov. 11, 1969

3,478,058
1,4-BENZODIOXAN-2-YL AMINO ACIDS
John T. Suh, Mequon, and Joseph A. Skorcz, Milwaukee, Wis., assignors to Colgate-Palmolive Company, New York, N.Y., a corporation of Delaware
No Drawing. Filed Apr. 15, 1968, Ser. No. 721,162
Int. Cl. C07d *15/18*; A61k *27/00*
U.S. Cl. 260—340.3
7 Claims

ABSTRACT OF THE DISCLOSURE

The compounds are 2-(1,4-benzodioxan-2-yl) amino acids which are useful as antihypertensive agents and chelating agents for heavy metal ions. A species disclosed is 2-(1,4-benzodioxan-2-yl)-alanine.

SUMMARY OF THE INVENTION

The present invention relates to novel amino acids of the formula

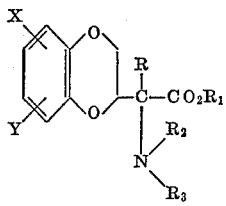

in which X and Y are hydrogen, a halogen such as chloro or bromo, trifluoromethyl, hydroxy, amino, nitro, lower alkyl sulfonamido, lower alkyl of 1 to 4 carbon atoms, and lower alkoxy such as methoxy or ethoxy, R is hydrogen, a lower alkyl of 1 to 4 carbon atoms, phenyl, a cycloalkyl of 3 to 7 carbon atoms such as cyclohexyl and cyclopentyl, a cycloalkyl-lower alkyl in which the cycloalkyl has 3 to 7 carbon atoms such as cyclopentyl ethyl or cyclohexyl methyl, and an aralkyl of 7 to 13 carbon atoms, especially, a phenyl-lower alkyl such as benzyl, phenethyl and phenylisopropyl, $R_1$ is hydrogen or lower alkyl and $R_2$ and $R_3$ are selected from hydrogen, a lower alkyl of 1 to 4 carbon atoms, a cycloalkyl of 3 to 7 carbon atoms, a cycloalkyl-lower alkyl in which the cycloalkyl has 3 to 7 carbon atoms, and an aralkyl of 7 to 13 carbon atoms.

DETAILED DESCRIPTION

The compounds of the invention are preferably prepared by reacting a 2-acryl-1,4-benzodioxan with potassium cyanide and ammonium carbonate in 50% aqueous ethanol at reflux, followed by acidification of the reaction mixture to form the corresponding 5-(1,4-benzodioxan-2-yl)-5-substituted hydantoin. The hydantoin is then treated with barium hydroxide octahydrate in water under reflux and the reaction mixture neutralized to yield the 2-(1,4-benzodioxan-2-yl)-alanine.

The described process may be illustrated as follows:

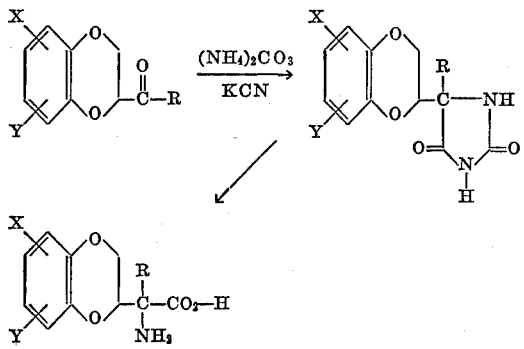

in which R, X and Y are as previously described and represent groups which do not interfere with or partake in the reactions.

Representative of the 2-acyl-1,4-benzodioxanes which may be employed in the described process are:

2-acetyl-1,4-benzodioxan,
2-formyl-1,4-benzodioxan,
2-propionyl-1,4-benzodioxan,
2-butyryl-1,4-benzodioxan,
2-benzoyl-1,4-benzodioxan,
2-phenylacetyl-1,4-benzodioxan, and the corresponding compounds containing nuclear substituents on the phenyl ring of the benzodioxane group such as 6-methoxy, 6-chloro, 7-trifluoromethyl, 5-hydroxy, 8-hydroxy, 5-ethoxy, 5-methoxy-8-chloro and 7-chloro-8-ethoxy. These compounds may be prepared as described in U.S. Patent No. 3,153,657.

Representative of the novel final compounds which can be prepared by the described practice are:

2-(1,4-benzodioxan-2-yl)-alanine,
2-(1,4-benzodioxan-2-yl)-2-phenylalanine,
2-(1,4-benzodioxan-2-yl)-glycine,
N,N-dimethyl-2-(1,4-benzodioxan-2-yl)-2-phenylglycine,
2-(6-chloro-1,4-benzodioxan-2-yl)-2-aminopentanoic acid, and
2-(7-trifluoromethyl-1,4-benzodioxan-2-yl)-2-amino-4-cyclopentylbutyric acid.

The compounds in which $R_2$ and $R_3$ are other than hydrogen may be prepared by conventional means. For example, the compounds in which $R_2$ and $R_2$ are both methyl may be prepared by treating a suitable primary amine with formic acid and formaldehyde. Amines in which $R_2$ is benzyl may be prepared by the treatment of the primary amine with benzaldehyde and then treating the resulting product with sodium borohydride or hydrogen in the presence of a suitable catalyst such as Raney nickel to form the corresponding benzylamino derivative. The monomethyl amino compound may be prepared by treating the benzylamino derivative with formic acid and formaldehyde to form the methyl benzylamino derivative which can be catalytically cleaved to form the monomethyl derivative.

The compounds in which $R_2$ is cycloalkyl may be prepared by treating a corresponding primary amine with a suitable ketone such as cyclohexanone in the presence of hydrogen in ethanol to form the corresponding amine.

Pharmaceutically acceptable salts of the novel compounds capable of forming such salts may be prepared by reacting such compounds, dissolved in a suitable mutual solvent, with an acid such as formic acid, citric acid, maleic acid, sulfuric acid, hydrochloric acid, succinic acid, tartaric acid, benzoic acid and fumaric acid.

The compounds of the present invention may be employed as chelating agents in chemical processes in which it is desired to inactivate heavy metal ions, such as ferric ions. The amino acids, being water soluble, are merely dissolved in warm water and added to the aqueous mixture containing the undesired ions in an amount calculated to be adequate to inactivate all or a sufficient amount of the undesired ions.

The compounds are, in addition, useful in the treatment of hypertension. For example, the compound 2-(1,4-benzodioxan-2-yl)-alanine when evaluated in the standard vagotomized, fasted, sodium pentobarbital anesthetized dog preparation, in a dose of about 20 mg./kg. was found to lower the blood pressure of the dogs 20–58 mm. over a four hour period. The compound also blocked or reversed the carotid occlusion response in the animals.

When employed as pharmaceutical agents the novel amino-acids are preferably combined with conventional pharmaceutical diluents, flavoring agents, disintegrating and lubricant ingredients and formed into conventional oral unit dosage forms such as capsules, tablets and the like, and parenteral dosage forms such as solutions. Generally the tablets or capsules will contain 150 to 500 mg. of the active ingredients.

The number of tablets or capsules an individual patient may receive in a given 24 hour period will, of course, depend upon the amount of medication contained in the unit dosage form selected and the patient's condition.

The following examples illustrate the practice of the invention:

EXAMPLE 1

5-(1,4-benzodioxan-2-yl)-5-methylhydantoin

A cloudy solution of recrystallized 2-acetyl-1,4-benzodioxan (53.4 g., 0.3 mole), 29.4 g. (0.45 mole) of KCN, and 173 g. (1.8 moles) of $(NH_4)_2CO_3$ in 2 liters of 50% aqueous ethanol is refluxed for 22 hours, then concentrated, cooled and acidified with concentrated HCl. The resulting precipitate is filtered, washed with water, and dried as a cream-colored powder, M.P. 204–208° with prior softening. An analytical sample of 5-(1,4-benzodioxan-2-yl)-5-methylhydantoin is recrystallized from aqueous ethanol and melts at 230–232°.

*Analysis.*—Calcd. for $C_{12}H_{12}N_2O_4$: C, 58.05; H, 4.88; N, 11.29. Found: C, 58.22; H, 4.94; N, 11.33.

EXAMPLE 2

2-(1,4-benzodioxan-2-yl)-alanine

The mixture of the hydantoin of Example 1 (24.8 g., 0.1 mole) and 134 g. (0.425 mole) of barium hydroxide octahydrate in 1 liter of water is refluxed for 2 days, then cooled, filtered, and acidified to pH 2 with concentrated $H_2SO_4$. The resulting fine white powder is removed by filtration through diatomaceous earth, and the filtrate brought to pH 7 with 6 N NaOH. The precipitated amino acid is filtered, washed with water, and dried to yield 2-(1,4-benzodioxan-2-yl)-alanine in the form of a white powder, M.P. 270–271°. Recrystallization from a large volume of water raises the M.P. to 280–281°.

*Analysis.*—Calcd. for $C_{11}H_{13}NO_4$: C, 59.18; H, 6.14; N, 6.28. Found: C, 59.29; H, 5.96; N, 6.30.

EXAMPLE 3

2-(1,4-benzodioxan-2-yl)-2-phenylalanine

The procedure of Example 1 is repeated employing 2-phenylacetyl-1,4-benzodioxan in place of 2-acetyl-1,4-benzodioxan to form 5-(1,4-benzodioxan-2-yl)-5-benzylhydantoin which when treated with barium hydroxide in the manner described in Example 2 yields 2-(1,4-benzodioxan-2-yl)-2-phenylalanine.

EXAMPLE 4

2-(1,4-benzodioxan-2-yl)-glycine

The procedure of Example 1 is repeated employing 2-formyl-1,4-benzodioxan in place of 2-acetyl-1,4-benzodioxan to form 5-(1,4-benzodioxan-2-yl)hydantoin which when treated with barium hydroxide in the manner described in Example 2 yields 2-(1,4-benzodioxan-2-yl)-glycine.

We claim:
1. A compound selected from the group consisting of a compound having the formula and pharmaceutically acceptable acid addition salts thereof

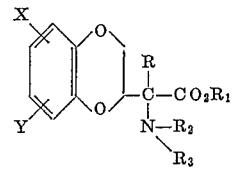

in which X and Y are hydrogen, hydroxy, halo, lower alkoxy or trifluoromethyl, R is hydrogen or lower alkyl, $R_1$ is hydrogen or lower alkyl, and $R_2$ and $R_3$ are hydrogen, lower alkyl of 1 to 4 carbon atoms, or phenyl-lower alkyl of 7 to 13 carbon atoms.

2. A compound of claim 1 in which X, Y and R and $R_1$ are hydrogen.
3. A compound of claim 1 in which $R_2$ and $R_3$ are hydrogen.
4. A compound of claim 1 in which $R_1$ is lower alkyl.
5. A compound of claim 1 in which R is lower alkyl.
6. A compound of claim 1 in which X, Y, R, $R_1$, $R_2$ and $R_3$ are hydrogen.
7. A compound of claim 1 in which X, Y, $R_1$, $R_2$ and $R_3$ are hydrogen and R is lower alkyl.

References Cited

Vittory et al., Gazz. Chim. Ital., vol. 93 (1963), pp. 38–45.

ALEX MAZEL, Primary Examiner

J. H. TURNIPSEED, Assistant Examiner

U.S. Cl. X.R.

424—278